(12) United States Patent
Xu (10) Patent No.: US 10,544,645 B2
(45) Date of Patent: Jan. 28, 2020

(54) DISSOLVABLE COMPOSITE SLIPS AND METHODS OF MANUFACTURING SAME

(71) Applicant: CNPC USA CORPORATION, Houston, TX (US)

(72) Inventor: Jianhui Xu, Katy, TX (US)

(73) Assignee: CNPC USA CORPORATION, Houston, TX (US)

( * ) Notice: Subject to any disclaimer, the term of this patent is extended or adjusted under 35 U.S.C. 154(b) by 1 day.

(21) Appl. No.: 15/720,559

(22) Filed: Sep. 29, 2017

(65) Prior Publication Data

US 2018/0087345 A1    Mar. 29, 2018

Related U.S. Application Data

(60) Provisional application No. 62/401,582, filed on Sep. 29, 2016.

(51) Int. Cl.
| | |
|---|---|
| *E21B 33/12* | (2006.01) |
| *E21B 33/134* | (2006.01) |
| *E21B 33/129* | (2006.01) |
| *E21B 23/06* | (2006.01) |
| *E21B 33/126* | (2006.01) |
| *C22C 21/00* | (2006.01) |
| *B32B 15/01* | (2006.01) |

(52) U.S. Cl.
CPC ......... *E21B 33/1208* (2013.01); *E21B 23/06* (2013.01); *E21B 33/1265* (2013.01); *E21B 33/1292* (2013.01); *E21B 33/134* (2013.01); *B32B 15/015* (2013.01); *C22C 21/00* (2013.01)

(58) Field of Classification Search
CPC ...... E21B 33/1208; E21B 23/01; E21B 23/06; E21B 33/1265; E21B 33/1292; E21B 33/134; B32B 15/015; C22C 21/00
See application file for complete search history.

(56) References Cited

U.S. PATENT DOCUMENTS

| | | | | |
|---|---|---|---|---|
| 2014/0224506 A1* | 8/2014 | Xu | ............. | E21B 33/134 166/376 |
| 2016/0108695 A1* | 4/2016 | Okura | ............. | E21B 33/12 166/376 |
| 2016/0160593 A1* | 6/2016 | Xu | ............. | E21B 23/01 166/382 |

* cited by examiner

*Primary Examiner* — Yong-Suk Ro
(74) *Attorney, Agent, or Firm* — Craft Chu PLLC; Andrew W. Chu (57) ABSTRACT

A dissolvable composite slip can include at least in part a dissolvable material. A dissolvable composite slip can include at least in part a non-dissolvable metallic material. The dissolvable material should be strong enough to support the non-dissolvable metallic material which serves as teeth to set into the casing during the function of the downhole tool. The dissolvable material can include but is not limited to a polymeric material or a metallic material. At least a part of the slip is able to be set as well as be dissolved.

11 Claims, 6 Drawing Sheets

DISSOLVABLE COMPOSITE SLIPS AND METHODS OF MANUFACTURING SAME

CROSS-REFERENCE TO RELATED APPLICATIONS

The application claims priority to U.S. Patent Application Ser. No. 62/401,582, filed Sep. 29, 2016, herein incorporated by reference in its entirety.

FIELD

The disclosure relates generally to downhole tools for oil exploration. The disclosure relates specifically to a slip for downhole tools.

BACKGROUND

Many downhole tools incorporate a gripping system that use one or more slips. The slips are moved radially outwardly against a surrounding tubular member to resist axial or torsional forces. In many instances, slips are set to securely anchor a downhole tool in place within a surrounding tubular member. Downhole tools that incorporate gripping systems that use slips include but are not limited to packers, anchors, plugs, locks and fishing tools. For example, bridge plugs have a plug body with slips to bitingly engage a surrounding tubular member.

After a downhole tool is set, it will often be removed to allow for further operation to proceed without being hindered by the presence of the downhole tool. Removal of the downhole tool is traditionally accomplished by complex retrieval operations involving milling or drilling the downhole tool for mechanical retrieval. In order to facilitate such operation, downhole tools have been composed of drillable materials, such as cast iron, brass or aluminum. These operations can be costly and time consuming, as they involve introducing a tool string into the wellbore and mechanically retrieving the downhole tool or pieces thereof from the wellbore to bring to the surface.

It would be advantageous to have a downhole tool that could be removed by dissolving a portion of the slips.

SUMMARY

An embodiment of the disclosure is a method of manufacturing a composite slip comprising: preparing a substrate portion comprising a dissolvable material, wherein the dissolvable material dissolves upon exposure to a dissolving agent; manufacturing a rough portion from a non-dissolvable metallic material, wherein the teeth portion does not dissolve upon exposure to the dissolving agent; and combining the substrate portion and the rough portion to form a composite slip. In an embodiment, the method further comprises having a metallic dissolvable insert between the rough portion and the substrate portion. In an embodiment, the dissolvable material is a polymeric dissolvable material or a metallic dissolvable material. In an embodiment, the rough material is selected from the group consisting of an Fe based alloy, carbide, oxide, sulfide, cast iron, low carbon steel, high carbon steel, nitride, silicide; and a combination thereof. In an embodiment, the rough material is applied by an adhesive. In an embodiment, the adhesive comprises thermal spray or epoxy glue.

An embodiment of the disclosure is a dissolvable composite slip, comprising: a substrate including a plurality of slip segments and slots between the slip segments; wherein the outer surface of at least one of the plurality of slip segments is made of hard material to form a rough surface and the rough surface does not dissolve upon exposure to the dissolving agent. In an embodiment, wherein the substrate comprises a dissolvable material, wherein the dissolvable material dissolves upon exposure to a dissolving agent. In an embodiment, the dissolvable material comprises a PGA based polymer, PLA based polymer, a Mg alloy, or an Al alloy. In an embodiment, the dissolvable composite slip further comprises a metallic dissolvable insert. In an embodiment, the metallic dissolvable insert comprises a Mg alloy or Al alloy. In an embodiment, the dissolvable composite slip further comprises a medium hard metallic coating between the rough surface and the body of the slip segment. In an embodiment, the medium hard metallic coating comprises a Co alloy or a Ni alloy. In an embodiment, the rough surface comprises a Fe based alloy, carbide, oxide, sulfide, nitride, silicide; and a combination thereof.

An embodiment of the disclosure is a dissolvable composite slip, comprising: a substrate including a plurality of slip segments and slots between the slip segments; each of the slip segment having one or a plurality of grooves to accommodate one or a plurality of wedge inserts; wherein the substrate is made from a dissolvable material, wherein the dissolvable material dissolves upon exposure to a dissolving agent; the wedge insert is made from a dissolvable metallic material; and wherein the outer surface of the wedge insert is made of hard material to form a rough surface, the rough surface does not dissolve upon exposure to the dissolving agent. In an embodiment, the dissolvable composite further comprises a medium hard metallic coating between the rough surface and the body of the wedge insert. In an embodiment, the medium hard metallic coating comprises a Co alloy or a Ni alloy. In an embodiment, the dissolvable material forming the substrate comprises a PGA or PLA based polymer. In an embodiment, the dissolvable metallic material forming the wedge insert comprises a Mg alloy or an Al alloy. In an embodiment, the rough surface is selected from comprises a Fe based alloy, carbide, oxide, sulfide, nitride, silicide; and a combination thereof.

An embodiment of the disclosure is a method of manufacturing a composite slip comprising: preparing a substrate portion comprising a dissolvable material, wherein the dissolvable material dissolves upon exposure to a dissolving agent; manufacturing a teeth portion from a non-dissolvable metallic material, the teeth portion does not dissolve upon exposure to the dissolving agent; and combining the substrate portion and the tooth portion to form a composite slip. In an embodiment, the dissolvable material is a polymeric dissolvable material. In an embodiment, the polymeric dissolvable material is selected from the group consisting of a polyglycolide, polyglycolic acid (PGA), polylactic acid, and polylactide (PLA). In an embodiment, the dissolvable material is a metallic dissolvable material. In an embodiment, the metallic dissolvable material is selected from the group consisting of a magnesium alloy and an aluminum alloy. In an embodiment, the metallic dissolvable material is processed by one selected from the group consisting of powder metallurgy processing and casting metallurgy processing. In an embodiment, the powder metallurgy processing occurs with the teeth material in place. In an embodiment, the powder metallurgy processing occurs with open spaces left for the teeth material. In an embodiment, the powder metallurgy processing occurs with post-machining of the open space. In an embodiment, the casting metallurgy processing occurs with open spaces left for the teeth material. In an embodiment, the casting metallurgy processing occurs with post-machining of the open space. In an embodiment, the teeth material is selected from the group consisting of cast iron; low carbon steel; high carbon steel; and carbide, oxide, nitride, silicide as a whole. In an embodiment, the teeth material is surface hardened. In an embodiment, the substrate portion and the teeth portion are combined with epoxy. In an embodiment, the teeth are not in place during substrate processing. In an embodiment, the epoxy is cured at room temperature. In an embodiment, the epoxy is cured at above room temperature. In an embodiment, the substrate portion is prepared with the teeth portion in place. In an embodiment, the substrate portion is prepared with open spaces for the teeth portion. In an embodiment, the substrate portion is machined to form open spaces for the teeth portion.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the disclosure are obtained, a more particular description of the disclosure briefly described above will be rendered by reference to specific embodiments thereof which are illustrated in the appended drawings. Understanding that these drawings depict only typical embodiments of the disclosure and are therefore not to be considered limiting of its scope, the disclosure will be described with additional specificity and detail through the use of the accompanying drawings in which.

DETAILED DESCRIPTION

The particulars shown herein are by way of example and for purposes of illustrative discussion of the preferred embodiments of the present disclosure only and are presented in the cause of providing what is believed to be the most useful and readily understood description of the principles and conceptual aspects of various embodiments of the disclosure. In this regard, no attempt is made to show structural details of the disclosure in more detail than is necessary for the fundamental understanding of the disclosure, the description taken with the drawings making apparent to those skilled in the art how the several forms of the disclosure may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

To reduce the cost and time required to mill or drill a downhole tool from a wellbore for its removal, dissolvable materials have been developed in the design of downhole tools. Dissolvable material technology provides benefits in the completion process in downhole applications. Benefits include but are not limited to saving the milling out process and reducing the risk of blockage of components after milling out.

As a component in completion process, the slip's teeth need to be hard and/or strong enough to be able to set into the casing during the tool's function. The existing dissolvable materials, however, are mainly soft materials, such as dissolvable polymers, magnesium alloys, aluminum alloys, or others. The teeth made from these existing dissolvable materials may be damaged when set into the casing during the tool's function, which can result in costly remedial measures in terms of both time and monetary expense.

In an embodiment, the composite dissolvable slip can fulfill two fundamental functions: setting and dissolving. The composite slip can comprise a dissolvable material as a substrate and a hard and/or strong metallic material as teeth.

Embodiments of the disclosure are directed to a dissolvable composite slip. The slip comprises an at least partly dissolvable material and at least partly non-dissolvable metallic material. The dissolvable material should be strong enough to support the non-dissolvable metallic material which serves as teeth to set into the casing during the function of the downhole tool. In an embodiment, the dissolvable material can be a polymeric material, metallic material, or combination thereof.

Figure 1:
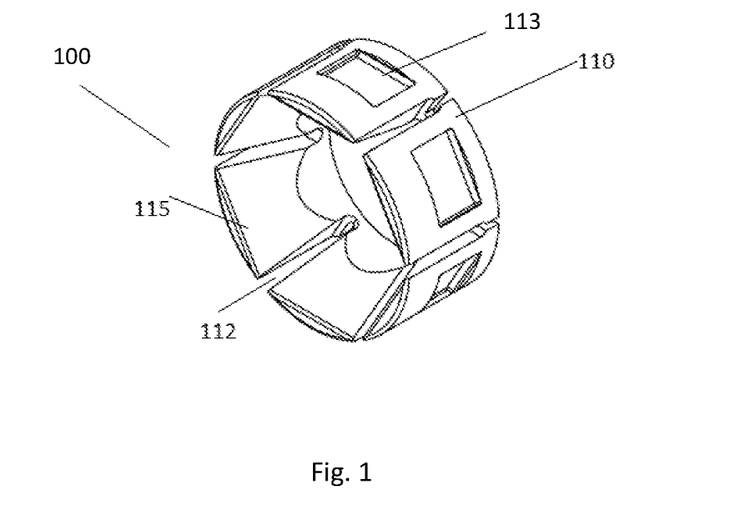
FIG. 1 is a perspective view of a substrate with open spaces for wedge-shaped teeth.

Referring to FIG. 1, the substrate 100 includes a plurality of slip segments 110 and slots 112 between the slip segments 110. In an embodiment, there are six slip segments 110. The outer surface of the slip segment has one or more open spaces 113 to accommodate the tooth/teeth. The slip segment 110 has a sloped inner surface 115. The slots 112 and the sloped inner surface 115 can facilitate the slip segments 110 to expand radically, such that tooth/teeth on the slip segments can bite into a casing wall to secure the slip in a desired location in the casing.

Figure 2:
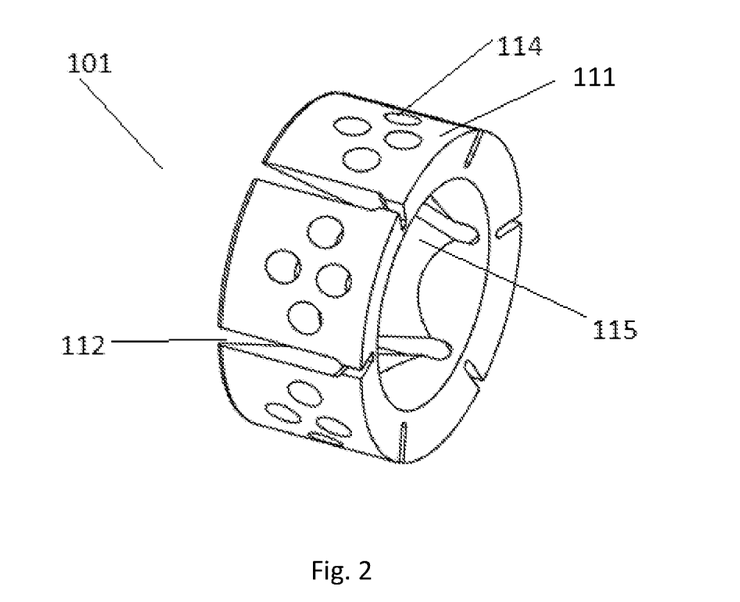
FIG. 2 is a perspective view of a substrate with open spaces for button-shaped teeth.

Referring to FIG. 2, the substrate 101 includes a plurality of slip segments 111 and slots 112 between the slip segments 111. In an embodiment, there are six slip segments 111. The outer surface of the slip segment 111 has one or more open spaces 114 to accommodate the tooth/teeth. The slip has a sloped inner surface 115. The slots 112 and the sloped inner surface 115 can facilitate the slip segments 111 to expand radically, such that tooth/teeth on the slip segments 111 can bite into a casing wall to secure the slip in a desired location in the casing.

Figure 3:
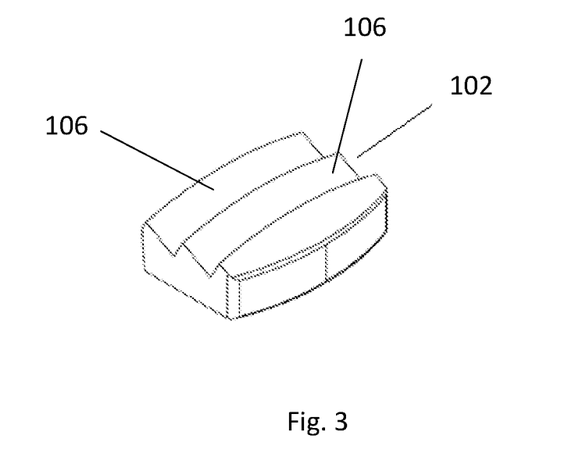
FIG. 3 is a perspective view of a tooth having a wedge shape.

Referring to FIG. 3, the tooth can be a wedge-shaped tooth 102. In an embodiment, the wedge-shaped tooth 102 can have a plurality of wedges 106 on its out surface such that the wedges 106 can stick in a casing wall.

Figure 4:
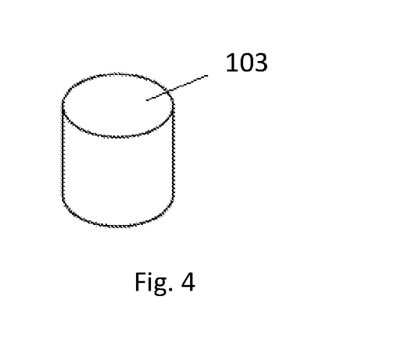
FIG. 4 is a perspective view of a tooth having a button shape.

Referring to FIG. 4, the tooth can be a button-shaped tooth 103. In an embodiment, the button-shaped tooth 103 can be a circular column, in order to bite into a casing wall.

Figure 5:
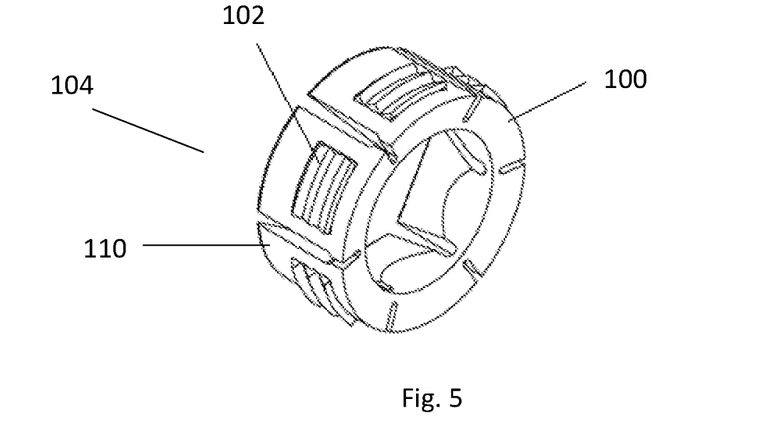
FIG. 5 is a perspective view of a composite slip composed of the substrate in FIG. 1 and the teeth in FIG. 3.

Referring to FIG. 5, in an embodiment, a composite slip 104 has a dissolvable material as substrate 100 and a hard/strong non-dissolvable material as teeth 102. The composite slip 104 comprises a substrate portion 100 and a teeth portion 102. The substrate portion 100 is substantially formed of a dissolvable material that is substantially dissolvable in response to a dissolving agent. The teeth portion 102 is in contact with the inner body portion and being formed of a non-dissolvable metallic material suitable to provide engaging contact with a tubular member near the outer teeth portion and that is not dissolvable by the dissolving agent. In an embodiment, each slip segment 110 has only one wedge shape tooth embedded in its open space 113. FIG. 5. In an embodiment, there are six slip segments 110. The non-dissolvable metallic material is surface hardening.

Figure 6:
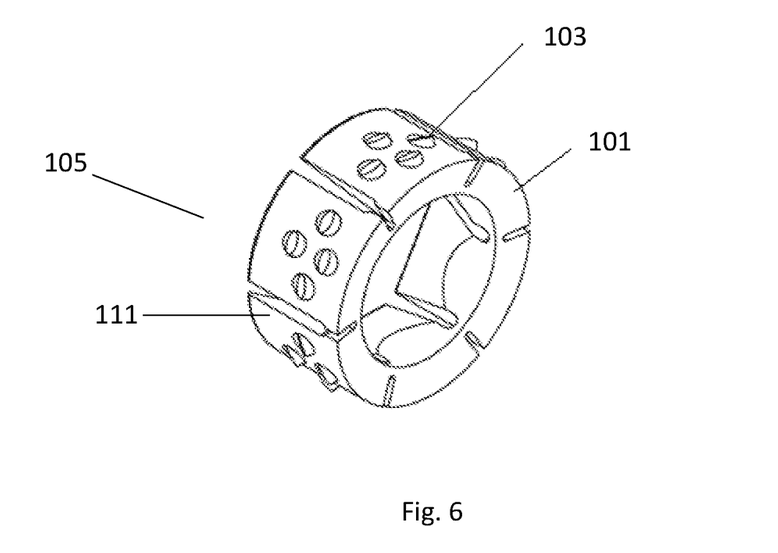
FIG. 6 is a perspective view of a composite slip composed of the substrate in FIG. 2 and the teeth in FIG. 4.

Referring to FIG. 6, in an embodiment, a composite slip 105 has a dissolvable material as substrate 101 and a hard/strong non-dissolvable material as teeth 103. The composite slip 105 comprises a substrate portion 101 and a teeth portion 103. The substrate portion 101 is substantially formed of a dissolvable material that is substantially dissolvable in response to a dissolving agent. The teeth portion 103 is in contact with the inner body portion and being formed of a non-dissolvable metallic material suitable to provide engaging contact with a tubular member near the outer teeth portion and that is not dissolvable by the dissolving agent. The non-dissolvable metallic material is surface hardening. In an embodiment, the axis of the button-shaped tooth 103 can tilt with respect to the horizontal section of the substrate 101 when the button-shaped tooth 103 is embedded into in its open space 114. The end edge of the button-shaped tooth 103 can stick in a casing wall. Each slip segment 111 can have a plurality of button-shaped teeth 103 embedded in its corresponding open spaces 114 to improve the biting force. In an embodiment, there are six slip segments 111.

The number, shape, and configuration of the tooth or teeth 102 and 103 are illustrative and by way of example only. Other numbers, shapes, and configurations of teeth can be used as desired. Other materials can be used to manufacture the tooth or teeth as desired.

Figure 7:
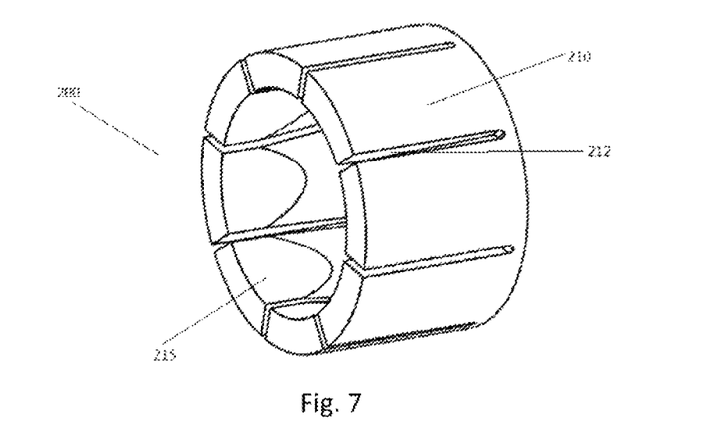
FIG. 7 is a perspective view of a slip with rough surface.

Referring to FIG. 7, a slip with rough surface is shown, the slip comprises a substrate 200 including a plurality of slip segments 210 and slots 212 between the slip segments 210. In an embodiment, there are eight slip segments 210. The outer surface of the slip segment is made of hard material and forms a rough surface. The slip segment 210 has a sloped inner surface 215. The slots 212 and the sloped inner surface 215 can facilitate the slip segments 210 to expand radically, such that the rough surface of the slip segments can bite into a casing wall to secure the slip in a desired location in the casing. Because of the rough surface, the outer surface of the slip segment can have no groove to accommodate a tooth to bite into a casing wall. On the other hand, the outer surface of the slip segment can have one or more grooves to accommodate one or more wedge inserts.

Figure 8:
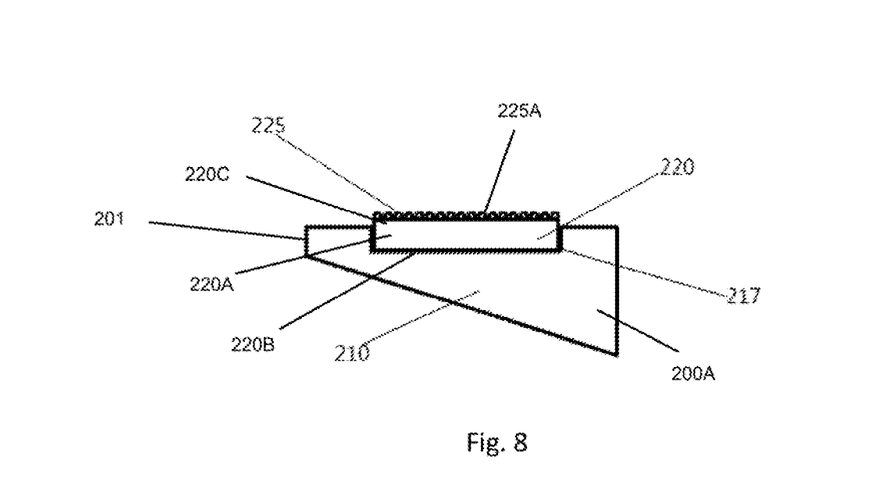
FIG. 8 is a cross-sectional view of a slip segment with a wedge.
Figure 9:
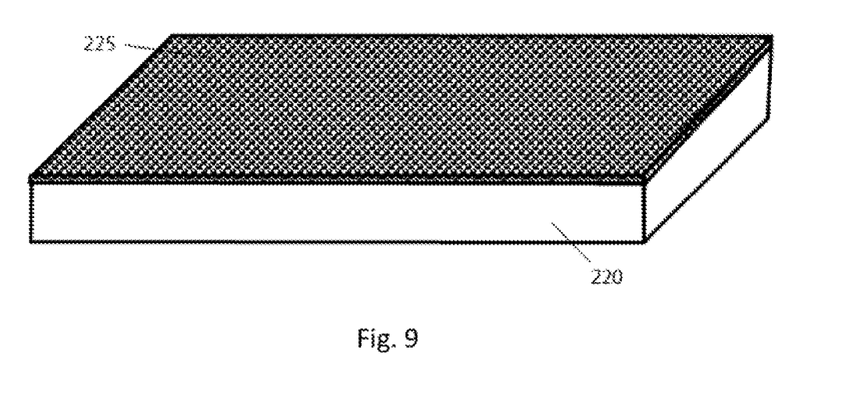
FIG. 9 is a perspective view of a wedge insert.

FIG. 8 is a cross-sectional view of a slip segment 210 with a wedge insert 220 of a dissolvable composite slip 201. Referring to FIG. 8, each slip segment 210 has a groove 217 to accommodate a wedge insert 220 which has a rough surface element 225. The slip segments 210 is a part of the substrate 200. The substrate 200 of the slip segment 210 is made from disintegrated non-metallic substrate 200A such as polyglycolic acid (PGA) or polyactic (PLA) based polymer. Polyglycolic acid or polyactic acid materials can be disintegrated after a set of time. Before that time, it has most of mechanical properties. After that time, it disintegrates into smaller pieces so that the dissolvable composite slip 201 or slip assembly will fall apart. It is desirable to let the slip disintegrate at that time and there will not be concern about the dissolving rate of the whole slip, including the metallic dissolvable inserts later. Referring to FIG. 9, the wedge insert 220 is substantially formed of a dissolvable metallic material 220A such as Mg or Al based alloys. The wedge insert has an inner wedge portion 220B and an outer wedge portion 220C opposite the inner wedge portion 220B. In order to provide engaging contact with a tubular member near the outer wedge insert portion and that is not dissolvable by the dissolving agent, the outer wedge portion 220C of the wedge insert 220 has a rough surface element 225 made of non-dissolvable material 225A such as Fe based alloys, carbide, oxide, sulfide, nitride, silicide, and a combination thereof, applied by thermal spray or epoxy glue on the body of the wedge insert 220.

Figure 10:
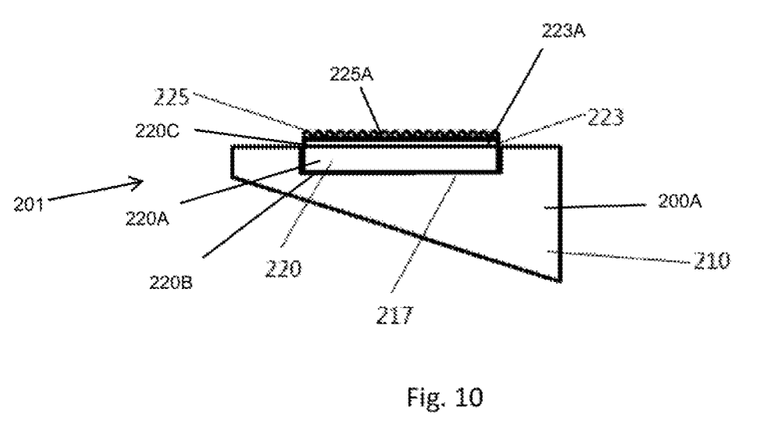
FIG. 10 is another cross-sectional view of a slip segment with a wedge.

FIG. 10 is another cross-sectional view of a slip segment with a wedge insert. Similar to FIG. 8, the slip segments 210 has a groove 217 to accommodate a wedge insert 220 which has an outer wedge portion 220 with a rough surface element 225. The slip segments 210 is a part of the substrate 200 In FIG. 7. The substrate 200 of the slip element 210 is made from disintegrated non-metallic substrate 200A such as PGA or PLA based polymer. The wedge insert 220 is substantially formed of a dissolvable metallic material 220A such as Mg or Al alloys. The outer wedge portion 220C of the wedge insert 220 has a rough surface element 225 made of non-dissolvable material 225A such as Fe based alloys, carbide, oxide, sulfide, nitride, silicide; and a combination thereof. In this embodiment, there is a buffer layer 223A comprised of a metallic coating 223 between the rough surface element 225 and the outer wedge portion 220C of the wedge insert 220. The metallic coating 223 is medium hard and can be electroplated on the surface of the wedge insert 220. The material can be Co alloys, Ni alloys, or other suitable materials. The medium hard metallic coating 223 is used as a buffer layer 223A so that the rough surface element 225 can be able to be applied on slip 201 with good bonding. The buffer layer 223A has much better ductility than that of the materials used as rough surfaces.

Figure 11:
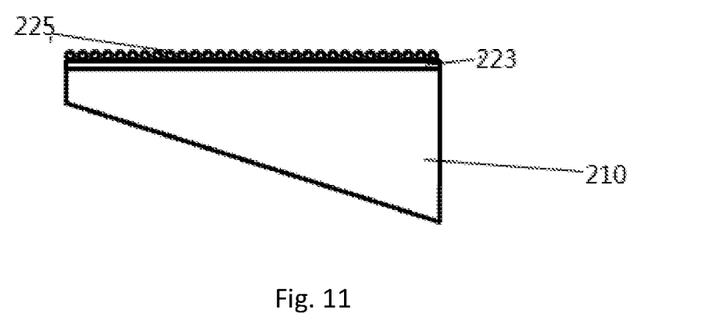
FIG. 11 is a cross-sectional view of a slip segment without a wedge.

FIG. 11 is a cross-sectional view of a slip segment without a wedge insert. Referring to FIG. 11, the slip segment 210 has a body which has an outer rough surface 225. The slip segments 210 is a part of the substrate 200 in FIG. 7. In one embodiment, the substrate 200 is made from disintegrated non-metallic substrate such as PGA or PLA based polymer. In another embodiment, the substrate 200 is substantially formed of a dissolvable metallic material such as Mg or Al based alloys. In order to provide engaging contact with a tubular member near the outer slip segment 210 portion and that is not dissolvable by the dissolving agent, the outer surface of the slip segment 210 has a rough surface 225 made of non-dissolvable material such as Fe based alloys, carbide, oxide, sulfide, nitride, silicide and a combination thereof applied by thermal spray or epoxy glue on the body of the slip segment 210. A medium hard metallic coating 223 is provided between the rough surface 225 and the body of the slip segment 210. The medium hard metallic coating 223 is electroplated on the surface of the wedge insert 220, The material can be Co alloys, Ni alloys, or other suitable materials. The medium hard metallic coating 223 is used as a buffer layer so that the rough surface 225 can be able to be applied with good bonding. The buffer layer has much better ductility than that of the materials used as rough surfaces.

In an embodiment, the teeth made of cast iron will be surface hardened by flame hardening or induction hardening.

In an embodiment, the teeth made of low carbon steel can be surface hardened by carburization, nitriding or boriding.

In an embodiment, the teeth made of high carbon steel can be surface hardened by flame hardening or induction hardening.

In an embodiment, various methods of manufacturing dissolvable polymeric materials as substrates include:
a. Molding with the teeth material in place;
b. Molding and leaving open spaces for the teeth;
c. Molding and post-machining the open spaces for teeth.

In an embodiment, the manufacturing of the dissolvable composite slip comprises: (1) manufacturing slip teeth made of one or more non-dissolvable metallic materials which is surface hardened to the required hardness enough for setting into the casing; (2) molding the polymeric dissolvable material with the hardened metallic material in teeth shape in place during molding process while the hardened metallic material serves as slip's teeth.

In an embodiment, the manufacturing of the dissolvable composite slip comprises: (1) manufacturing slip teeth made of one or more non-dissolvable metallic materials which is surface hardened to the required hardness enough for setting into the casing; (2) molding the substrate using polymeric dissolvable material without the hardened metallic material in teeth shape in place during molding process; and leaving open spaces for the teeth. In an embodiment, the teeth are fastened in place using epoxy. In an embodiment, epoxy resin is place on the surface of the substrate on the outside of the open spaces and the teeth and substrate are fastened together. In an embodiment, the composite slip is cured at room temperature. In an embodiment, the composite slip is cured at an above room temperature.

In an embodiment, the manufacturing of the dissolvable composite slip comprises: (1) manufacturing slip teeth made of one or more non-dissolvable metallic materials which is surface hardened to the required hardness enough for setting into the casing; (2) molding the substrate using polymeric dissolvable material without the hardened metallic material in teeth shape in place during molding process, (3) post-machining open spaces for the teeth, and (4) fastening the slip teeth to the substrate. In an embodiment, the teeth are fastened in place using epoxy. In an embodiment, epoxy resin is place on the surface of the substrate on the outside of the open spaces and the teeth and substrate are fastened together. In an embodiment, the composite slip is cured at room temperature. In an embodiment, the composite slip is cured at an above room temperature.

In another embodiment, a method of manufacturing the slip comprises manufacturing the slip teeth from a non-dissolvable metallic material, surface hardening the slip teeth in order for them to be strong enough for setting into the casing, molding the polymeric dissolvable material and the hardened metallic material into slip shape while the hardened metallic material serves as slip's teeth.

In one embodiment, the dissolvable material is a polymeric material. The dissolvable polymeric materials can include but is not limited to polyglycolide, polyglycolic acid (PGA), polylactic acid, or polylactide (PLA).

In an embodiment, various methods of manufacturing dissolvable metallic materials as substrates comprise:
a. Powder metallurgy processing with the teeth material in place;
b. Powder metallurgy processing and leaving open spaces for the teeth;
c. Powder metallurgy processing and post-machining the open spaces for the teeth;
d. Casting metallurgy processing and leaving open spaces for teeth;
e. Casting metallurgy processing and post-machining the open spaces for the teeth.

In an embodiment, the method includes manufacturing of teeth made of non-dissolvable metallic material; surface hardening the teeth in order to be strong enough for setting into the casing; and powder metallurgy processing of the metallic dissolvable material.

In an embodiment using metallic material as a dissolvable material, the manufacturing of the dissolvable composite slips shall be: (1) manufacturing of slip teeth made of non-dissolvable metallic material which is surface hardened to the required hardness enough for setting into the casing; (2) power metallurgy processing of the metallic dissolvable material as substrate, by placing the surface hardened slip teeth in place during powder metallurgy processing.

In an embodiment using metallic material as a dissolvable material, the manufacturing of the dissolvable composite slips shall be: (1) manufacturing of slip teeth made of non-dissolvable metallic material which is surface hardened to the required hardness enough for setting into the casing; (2) power metallurgy processing of the metallic dissolvable material as substrate, by either leaving open spaces for the slip teeth during powder metallurgy processing or post machining the open space for the slip teeth; (3) and bonding the hardened metallic material in teeth shape into the open space of the metallic dissolvable material by using epoxy resins and the hardened metallic material serves as slip's teeth.

In an embodiment using metallic material as a dissolvable material, the manufacturing of the dissolvable composite slips shall be: (1) manufacturing of slip teeth made of non-dissolvable metallic material which is surface hardened to the required hardness enough for setting into the casing; (2) cast metallurgy of the metallic dissolvable material as substrate, by either leaving open spaces for slip teeth during casting or post machining the open space for the slip teeth; (3) and bonding the hardened metallic material in teeth shape into the open space of the metallic dissolvable material by using epoxy resins and the hardened metallic material serves as slip's teeth.

In an embodiment, the dissolvable material is a dissolvable metallic material. The dissolvable metallic materials include but are not limited to a magnesium alloy or aluminum alloy. In an embodiment, the dissolvable metallic material is a similar alloy. In an embodiment, the dissolvable metallic material is a similar metal.

In an embodiment, a method for preparing a composite slip when the teeth are not in place during the dissolvable substrate processing comprises:

Fully brushing epoxy resin on both the open pockets of the dissolvable substrate and the body of non-dissolvable teeth, Attaching the open pockets of the dissolvable substrate and the body of the non-dissolvable teeth together; and Curing the composite slip at room temperature or elevated temperature.

From the foregoing description, one of ordinary skill in the art can easily ascertain the essential characteristics of this disclosure, and without departing from the spirit and scope thereof, can make various changes and modifications to adapt the disclosure to various usages and conditions. The disclosure can be embodied in other specific forms without departing from it spirit or essential characteristics. A person

What is claimed is:

1. A dissolvable composite slip, comprising:
a slip segment being comprised of a non-metallic disintegrated substrate and having a groove;
a wedge insert having an inner wedge portion and an outer wedge portion opposite said inner wedge portion, being housed in said groove and being comprised of a dissolvable metallic material; and
a rough surface element on said outer wedge portion, said rough surface element being comprised of non-dissolvable material,
wherein a position of said rough surface element relative to said wedge insert is independent from a position of said rough surface element relative to said non-metallic disintegrated substrate of said slip element.

2. The dissolvable composite slip of claim 1, wherein said non-metallic disintegrated substrate comprises a polyglycolic acid polymer or a polyactic acid polymer, wherein said dissolvable metallic material comprises a Mg alloy, or an Al alloy.

3. The dissolvable composite slip of claim 1, further comprising; a buffer layer being comprised of a metallic coating and being positioned between said rough surface element and said outer wedge portion.

4. The dissolvable composite slip of claim 3, wherein said metallic coating comprises a Co alloy or a Ni alloy.

5. The dissolvable composite slip of claim 1, wherein said rough surface element comprises at least one of a group consisting of: a Fe based alloy, carbide, oxide, sulfide, nitride, silicide; and a combination thereof.

6. A method for removing a downhole tool, the method comprising the steps of:
forming a dissolvable composite slip, comprising:
a slip segment being comprised of a non-metallic disintegrated substrate and having a groove; and
a wedge insert housed in said groove and being comprised of a dissolvable metallic material; and
a rough surface element on said wedge insert opposite said slip segment, said rough surface element being comprised of non-dissolvable material
setting said dissolvable composite slip within a tubular member in a wellbore;
disintegrating said non-metallic disintegrated substrate into a plurality of pieces so as to release said wedge insert and said rough surface element down said wellbore; and
dissolving said dissolvable metallic material with a dissolving agent.

7. The method of claim 6, wherein said dissolvable composite clip further comprises: a metallic coating between said rough surface element and said wedge insert.

8. The method of claim 7, wherein said metallic coating comprises a Co alloy or a Ni alloy.

9. The method of claim 6, wherein said non-metallic disintegrated substrate comprises a polyglycolic acid polymer or a polyactic acid polymer.

10. The method of claim 6, wherein said dissolvable metallic material comprises a Mg alloy or an Al alloy.

11. The method of claim 6, wherein said rough surface element comprises at least one of a group consisting of: a Fe based alloy, carbide, oxide, sulfide, nitride, silicide; and a combination thereof.

* * * * *